Patented Dec. 8, 1942

2,304,233

UNITED STATES PATENT OFFICE 2,304,233

METHOD OF INSULATING PANELS

William M. Bergin, Granville, and Allen L. Simison, Newark, Ohio

No Drawing. Original application July 26, 1938, Serial No. 221,460. Divided and this application October 11, 1940, Serial No. 360,820

6 Claims. (Cl. 20—4)

The present invention relates to a method of applying fibrous insulating material to hollow insulated panels or to other cavities. The invention has special application to insulating panels with glass wool.

This application is a division of our copending application Serial Number 221,460, filed July 26, 1938, now Patent No. 2,252,157, dated August 12, 1941.

An insulated panel, as for example the door, side or top of an oven, refrigerator or the like may be insulated before or after assembly of the panel into the structure by packing the same with insulating material during formation of the panel. To properly fill the hollow of the panel it has been the practice to apply loose insulating material that will conform to the irregularities and contour of the panel. Such loose material was found to settle and pack down in the panel during use and thus leave voids in the insulation that reduced the efficiency of the insulation.

A rigid bonded insulating material that would, to a certain extent, obviate the above difficulties is costly because of the intricate shapes of the bats required, and the close tolerances to which the bats of insulation must be made if the panels are to be effectively filled.

It is an object of the present invention to provide a method of insulating hollow panels or cavities with fibrous insulation to fill all contours and irregularities with a semi-rigid self-sustaining fibrous bat of permanent form that will not pack down or be deformed by vibration to which the panel may be subjected.

It is another object of the present invention to produce panels or the like, insulated with fibrous material that will be retained in an integral mat through a wide range of temperatures.

It is a further object of the present invention to provide a method of inexpensively insulating panels with a semi-rigid permanent insulating bat that will be of the exact form of the interior of the panel.

Heretofore numerous binders have been suggested and used for bonding together mineral wool fibers into bats. Most generally such materials as asphalt, gypsum, starch, rosin, linseed oil, glue, sodium silicate, pitch or the like have been attempted. These binders generally are water soluble or thermoplastic. If water soluble, they have for that reason proved unsatisfactory when subjected to moisture conditions. If thermoplastic, they are unsatisfactory when subjected to certain temperature conditions. Various other disadvantages have attended the use of these materials as, for example, the rosin is subjected to oxidation and embrittlement after only a short period during the life of the bat; sodium silicate attacked the fibrous material particularly if it contained an alkaline constituent.

For the purpose of the present invention we have discovered that a fibrous bat for effectively filling a cavity and having highly superior properties may be produced by using a very small amount of thermosetting, condensation product. This may be and preferably is combined with an oleaginous lubricant such as oil incompatible and immiscible with the condensation product, fatty material, or the tempering oil emulsion patented and described in the Williams and Bone Patent No. 2,083,132, or their Patent No. 2,107,284.

Various thermosetting condensation products may be used, as, for example, phenol formaldehyde, urea formaldehyde, or various modifications and variations of these synthetic materials which may be made by one skilled in the art to produce a resin originally in a liquid state, and finally in a hard, strong, solid mass. For ordinary purposes Bakelite, originally as water soluble material has been found very satisfactory for use in the present invention.

A small amount of the thermosetting stiffening agent may be added to the tempering oil or lubricating mixture and applied directly to the blasted fibers. Preferably, however, the combination is first emulsified with water and then sprayed on the glass fibers as they are building up to mat formation upon a conveyor.

Various proportions of materials may be used, although it has been found that a small proportion of only about ½% to 1¼% of Bakelite per weight of wool is sufficient for ordinary purposes. When minute amounts of about ½ to ¾ of a percent are used, the bat has materially increased stiffness and resilience, and reduced limpness, but it is not rigid or stiff. With increased amounts, the bat assumes a semi-rigid form, and with the higher amounts, a fair amount of rigidity and strength is attained. The bat is still resilient and tough and can withstand considerable bending or compression stress without destroying its properties.

The finished bat may thus have about ½ to 2½% thermosetting stiffening agent, about an equal amount of fatty acid, generally about 1%, acting as an emulsifier if desired, and a suitable amount of oil, such as petroleum oil or the like in amounts of about 2% or so, as desired. Metallic soap, waxes, fats or the like may also be added to increase water repellancy of the bat if desired. Bentonite or the like may be added to act as an emulsifier, and to increase the heat insulating properties of the bat.

The method of applying the emulsion or mixture of lubricant and binder may be similar to any of those now in use. Ordinarily it is preferable to spray the mixture onto the fibers as they build up into mat formation and are continuously withdrawn in this formation. It is desirable to accomplish this process over the fiber deposition zone in order to control the deposition and preferably to apply sufficient heat to evaporate the aqueous phase of the emulsion, leaving the lubricant and binder or stiffening agent distributed over the fibers. After removal from the deposition zone and while in a loose fluffy state, the bat is inserted into a panel such as that of a refrigerator or stove or the like, and pressed into place to fill all irregularities in the surfaces of the panels and to conform to the contour thereof.

In the case of panels or other pieces of equipment made up a number of separate parts the loose wool may be placed between the parts and the parts then clamped or bolted together.

After the panel has been filled with the loose wool it is heat treated to cause the stiffening agent or binder to polymerize into a final set, thus adding stiffness and a controlled amount of rigidity and resilience to the insulation. This heating may be accomplished as a separate step in the process of manufacture of the insulated article or may be effected in combination with other heating operations, such, for instance, as baking an enamel or other finish on the article or, in the case of stoves and ovens, may take place after the equipment is placed in use.

At the completion of the heating, however accomplished, the insulation within the panel is in the form of an integral bat having sufficient strength and rigidity to retain its shape and size throughout continued use of the insulated equipment. Subsequent heating of the insulation within ordinary ranges will not affect the insulation and cause it to become brittle or lose its shape.

The reason why such a small amount of binder, as, for example, an amount less than or about 1% can effect such striking increases in strength and stiffness of the bat is not fully understood, although several reasons have been advanced to explain the phenomenon. From observations under a microscope, it was noted that at a large number of intersections of fibers, it appeared that the stiffening agent congregated in very small amounts and coated the intersections with rounded smooth concave surfaces in a manner similar to a fillet, thus imparting high structural strength with a minimum quantity of material.

In accomplishing this desirable distribution, the thermosetting material originally in liquid form has a high wetting power and distributes itself at the intersections in this manner. When hardened, however, it tends to retain this form and thus structurally assume an ideal contour with respect to the adjacent fibers. The small amount involved, however, avoids rigidity to a point of brittleness, and permits the product to achieve a certain amount of flexibility and yieldability under stress.

It is also considered possible that the oleaginous lubricant would form a uniform, homogeneous coating over the individual fibers, and that an incompatible thermosetting resin acts as a binder or stiffener independently. The lubricant over the fibers, however, would provide a sufficient amount of yieldability so that the bat would attain a high degree of resilience and strength without causing excessive rigidity and embrittlement of the individual fibers.

Various modifications and variations may be resorted to within the spirit and scope of the present invention as defined in the appended claims.

We claim:

1. The method of insulating a heat insulating panel which comprises depositing fibrous mineral material in a gaseous atmosphere upon a surface to form a fluffy integral mat, spraying the fibers as they build up into mat form with a treating material containing an oleaginous substance and a partially polymerized thermosetting aldehyde condensation product in liquid form and incompatible with said lubricant, inserting said mat in an insulating panel to fill all portions of the panel, and completely polymerizing the said condensation product by means of heat to harden the same and stiffen said fibrous mat.

2. The method of producing a panel thermally insulated with a light-weight, resilient mat of glass fibers which comprises depositing said fibers and a treating material to form a loosely felted integral mat having the treating material disposed over the fibers, said treating material including a lubricant in aqueous emulsion and partially reacted water soluble phenol formaldehyde incompatible with said lubricant, inserting said mat in a panel to be insulated to cause the mat to conform to the contours of the panel, and then completing the reaction of said phenol formaldehyde by heat treating the mat in said panel to thereby stiffen and strengthen the mat.

3. The method of insulating a heat insulating panel which comprises forming a fluffy integral bat of mineral wool, disposing over the surfaces of the fibers of said bat a binder comprising a partially polymerized thermosetting aldehyde condensation product and an oleaginous lubricant incompatible therewith, inserting the bat so treated in the cavity of said panel, and then completing the polymerization of said condensation product by applying heat to said panel to thereby stiffen said bat in situ.

4. The method of insulating a heat insulating panel which comprises forming a loosely felted, fluffy bat of glass wool, distributing over the surfaces of the fibers of said bat a treating material comprising a partially reacted thermosetting phenol formaldehyde condensation product and an oleaginous lubricant incompatible therewith, inserting the bat so treated in the cavity of said panel, and then completing the reaction of said condensation product by applying heat to said panel to thereby stiffen said bat in situ.

5. The method of applying insulation to a cavity therefor which comprises applying to the fibers of a loosely felted, fluffy mineral wool bat a treating material comprising an oleaginous lubricant and a partially reacted thermosetting aldehyde condensation product in liquid form and incompatible with said lubricant, inserting said bat in the cavity, and then completing the reaction of said condensation product to harden the same and thereby form a self-sustaining bat in the cavity.

6. The method of applying insulation to a heat insulating panel which comprises forming a fluffy glass wool bat and applying to the fibers thereof a treating material containing an oleaginous lubricant in aqueous emulsion and a binder comprising partially reacted water-soluble phenol formaldehyde incompatible with said lubricant, inserting said mass in the cavity of said panel, and then completing the reaction of said phenol formaldehyde by applying heat to said panel to thereby stiffen said mass in said panel.

WILLIAM M. BERGIN.
ALLEN L. SIMISON.

CERTIFICATE OF CORRECTION.

Patent No. 2,304,233.　　　　　　　　　　　　　　　December 8, 1942.

WILLIAM M. BERGIN, ET AL.

It is hereby certified that error appears in the above numbered patent requiring correction as follows: In the grant, line 2, after "Ohio," insert --assignors, by mesne assignments, to Owens-Corning Fiberglas Corporation, Toledo, Ohio, a corporation of Delaware,--; line 12, for "William M. Bergin and Allen L. Simison, their heirs" read --Owens-Corning Fiberglas Corporation, its successors--; and in the heading to the printed specification, line 4, after "Ohio" insert --,assignors, by mesne assignments, to Owens-Corning Fiberglas Corporation, Toledo, Ohio, a corporation of Delaware--; and that the said Letters Patent should be read with this correction therein that the same may conform to the record of the case in the Patent Office.

Signed and sealed this 26th day of January, A. D. 1943.

Henry Van Arsdale,
Acting Commissioner of Patents.

(Seal)